US008860980B2

(12) United States Patent  (10) Patent No.: US 8,860,980 B2
Seo  (45) Date of Patent: Oct. 14, 2014

(54) ADMINISTRATOR TERMINAL CONNECTED TO IMAGE FORMING APPARATUS AND CLIENT, IMAGE FORMING SYSTEM INCLUDING THE SAME, AND REMOTE INSTALLING METHOD FOR DRIVER THEREOF

(75) Inventor: Jung-soo Seo, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 421 days.

(21) Appl. No.: 12/609,367

(22) Filed: Oct. 30, 2009

(65) Prior Publication Data

US 2010/0097650 A1 Apr. 22, 2010

(30) Foreign Application Priority Data

Dec. 22, 2008 (KR) ........................ 10-2008-0131077

(51) Int. Cl.
G06F 3/12 (2006.01)
G06K 15/00 (2006.01)
G06F 9/44 (2006.01)

(52) U.S. Cl.
CPC ............ G06F 3/1225 (2013.01); G06F 3/1204 (2013.01); G06F 3/1288 (2013.01); G06F 9/4411 (2013.01)
USPC .......................... 358/1.15; 358/1.13; 358/1.16

(58) Field of Classification Search
None
See application file for complete search history.

(56) References Cited

U.S. PATENT DOCUMENTS

| 6,681,392 | B1 * | 1/2004 | Henry et al. .................. 717/176 |
| 7,522,299 | B2 | 4/2009 | Nguyen et al. |
| 7,716,341 | B2 | 5/2010 | Takase |
| 2002/0083431 | A1 * | 6/2002 | Machida ........................ 717/174 |
| 2003/0200289 | A1 * | 10/2003 | Kemp et al. .................... 709/221 |
| 2003/0217194 | A1 * | 11/2003 | Kazumi et al. ................ 709/321 |
| 2005/0134904 | A1 * | 6/2005 | Voskuil ........................ 358/1.15 |
| 2006/0224705 | A1 * | 10/2006 | Takase .......................... 709/220 |
| 2009/0059272 | A1 * | 3/2009 | Matsushita et al. .......... 358/1.15 |

FOREIGN PATENT DOCUMENTS

JP 2006-277446 10/2006
KR 10-2005-0002602 1/2005

OTHER PUBLICATIONS

Korean Office Action dated Feb. 10, 2014 issued in KR Application No. 10-2008-0131077.

* cited by examiner

Primary Examiner — Marivelisse Santiago Cordero
Assistant Examiner — Moustapha Diaby
(74) Attorney, Agent, or Firm — Stanzione & Kim, LLP

(57) ABSTRACT

An administrator terminal connected to an image forming apparatus and a client, an image forming system including the same, and a method to remotely an install a driver. The method to remotely an install a driver in an administrator terminal connecting with at least one image forming apparatus and at least one client includes searching for at least one image forming apparatus connected to the administrator terminal, selecting at least one client sharing and using the searched image forming apparatus, selecting an image forming apparatus server according to a network connection type of the image forming apparatus, and installing the driver of the image forming apparatus on the at least one selected client through the selected image forming apparatus server. Thus, at least one client is selected among clients where the driver is installed, and the driver is simultaneously installed according to the selected clients, thereby saving time and cost and providing a convenience to a user.

20 Claims, 7 Drawing Sheets

ADMINISTRATOR TERMINAL CONNECTED TO IMAGE FORMING APPARATUS AND CLIENT, IMAGE FORMING SYSTEM INCLUDING THE SAME, AND REMOTE INSTALLING METHOD FOR DRIVER THEREOF

CROSS-REFERENCE TO RELATED APPLICATIONS

This application claims priority under 35 U.S.C. §119(a) of Korean Patent Application No. 10-2008-0131077, filed on Dec. 22, 2008 in the Korean Intellectual Property Office, the disclosure of which is incorporated herein by reference.

BACKGROUND

1. Field of the Invention

Apparatuses and methods consistent with the present general inventive concept relate to an administrator terminal connected to an image forming apparatus and a client, an image forming system including the same, and a method to remotely install a driver, and more particularly, to an administrator terminal connected to an image forming apparatus and a client, an image forming system including the same, and a method to remotely install a driver, in which the drivers are remotely installed according to user groups.

2. Description of the Related Art

An image forming apparatus forms an image to be printed on paper. The image forming apparatus may include a printer, a copying machine, a facsimile, a multi-function peripheral having two or more functions, etc.

The demand for an office automation system in which the image forming apparatus performs the functions of the scanner, the facsimile, etc. as well as a function of printing a document like a multi-function peripheral has been on the rise. Accordingly, the image forming apparatus has been gradually developed to have higher performance, thereby extending its effective functions.

Thus, to more effectively administer the image forming system including at least one client personal computer (PC, as a host apparatus) connected on a network, a system administrator installs and administers a driver of the image forming apparatus on respective clients.

Specifically, the system administrator remotely accesses each client through a PC provided as an administrator terminal, and performs remote installation such as distributing, installing or deleting software such as a driver.

In performing the remote installation of the driver as described above, the administrator terminal shares the driver installed in a server PC for a specific image forming apparatus shared on the network, and installs the driver through "Point & Print" by a searching and adding process for the image forming apparatus that is shared with each client.

Therefore, in a conventional image forming system supporting the remote installation, the administrator terminal repetitively performs installation work such as searching and adding the shared image forming apparatuses through the "Point & Print" to the respective clients in order to install the driver in the client.

Consequently, time and costs are wasted in the installation work. Also it is inconvenient for the administrator since the same work is performed repetitively.

SUMMARY

Accordingly, an aspect of the present general inventive concept is to provide an administrator terminal connected to an image forming apparatus and a client, an image forming system including the same, and a method to remotely install a driver, in which at least one client is selected among clients where the driver is installed, and the driver is simultaneously installed according to the selected clients, thereby saving time and cost and providing a convenience to a user.

Additional features and utilities of the present general inventive concept will be set forth in part in the description which follows and, in part, will be obvious from the description, or may be learned by practice of the general inventive concept.

The foregoing and/or utilities and other aspects of the present general inventive concept can be achieved by providing a method to remotely install a driver in an administrator terminal connecting with at least one image forming apparatus and at least one client, the remote installing method including searching for at least one image forming apparatus connected to the administrator terminal; selecting at least one client sharing and using the searched image forming apparatus; selecting an image forming apparatus server according to a network connection type of the image forming apparatus; and installing the driver of the image forming apparatus on the at least one selected client through the selected image forming apparatus server.

The selecting the image forming apparatus server may include selecting the administrator terminal or one of the clients as the image forming apparatus server. If the searched image forming apparatus is locally connected to the administrator terminal or the client, the selecting the image forming apparatus server may include selecting the locally connected administrator terminal or the locally connected client as the image forming apparatus server.

The remote installing method may further include selecting a sharing name of the shared image forming apparatus.

The remote installing method may further include sharing the driver of the image forming apparatus installed in the image forming apparatus server, where the installing the driver includes using the shared driver.

The remote installing method may further include an installing manager for installing the driver to the selected client, where the installing the driver includes using the installing manager.

The selecting the client may include setting up a group including the selected clients, and the installing the driver may include installing the driver to clients included in the set group.

If the driver is previously installed in the client, the installing the driver may include updating the previously installed driver.

Further utilities and aspects of the present general inventive concept may be achieved by providing an administrator terminal connecting with at least one image forming apparatus and at least one client, the administrator terminal including a communication unit which communicates with the at least one image forming apparatus and the at least one client, a user interface which allows a user to select at least one client sharing and using the image forming apparatus and select an image forming apparatus server according to a network connection type of the image forming apparatus, and a controller which controls the communication unit to transmit a command to search for at least one connected image forming apparatus, and installing a driver of the image forming apparatus on the at least one selected client through the selected image forming apparatus server.

The user interface may allow a user to select the administrator terminal or one of the clients as the image forming apparatus server.

If the searched image forming apparatus is locally connected to the administrator terminal or one of the clients, the user interface may allow a user to select the locally connected administrator terminal or the locally connected client as the image forming apparatus server.

The user interface may allow a user to select a sharing name of the shared image forming apparatus.

The controller may control the communication unit to transmit a command for sharing the driver of the image forming apparatus installed in the image forming apparatus server, and using the shared driver.

The controller may control the communication unit to transmit a command for installing an installing manager for installing the driver to the selected client, and using the installing manager to install the driver.

The user interface may allow a user to set up a group including the selected clients, and the controller may control the communication unit to transmit a command to install the driver on the client included in the set group.

If the driver is previously installed in the client, the controller may control the communication unit to transmit a command to update the previously installed driver.

Still further utilities and aspects of the present general inventive concept may be achieved by providing an image forming system including an administrator terminal, at least one image forming apparatus and at least one client, the administrator terminal including a first communication unit which communicates with the at least one image forming apparatus and the at least one client, a user interface which allows a user to select at least one client sharing and using the image forming apparatus and select an image forming apparatus server according to a network connection type of the image forming apparatus, and a first controller which controls the first communication unit to transmit a command to search for at least one connected image forming apparatus, and installing a driver of the image forming apparatus on the at least one selected client through the selected image forming apparatus server, and the client including a second communication unit which communicates with the image forming apparatus server and the administrator terminal, and a second controller which installs the driver on the client through the image forming apparatus server if receiving the command for installing the driver from the administrator terminal through the second communication unit.

The user interface may allow a user to select the administrator terminal or the client as the image forming apparatus server.

If the searched image forming apparatus is locally connected to the administrator terminal or the client, the user interface may allow a user to select the locally connected administrator terminal or the locally connected client as the image forming apparatus server.

Further utilities and aspects of the present general inventive concept may be achieved by providing an administrator terminal connected to one or more image forming apparatuses and one or more client terminal includes a communication unit to communicate with the image forming apparatuses and the client terminals, and an interface unit to generate a screen representing installation of a print driver of the image forming apparatus according to the communication of the communication unit with the image forming apparatuses and the client terminal. The administrator terminal may also include a display unit to display the screen representing installation of the print driver of the image forming apparatus.

The screen representing installation of the print driver of the image forming apparatus may include an installation state of the print driver of the image forming apparatus in the client terminals.

The screen representing installation of the print driver of the image forming apparatus may include an installation state of the print driver of the image forming apparatus in each of the one or more client terminals.

Further utilities and aspects of the present general inventive concept may be achieved by providing a method to remotely install a driver in an administrator terminal connected to at least one image forming apparatus and a plurality of clients, the method including searching for at least one image forming apparatus connected to the administrator terminal, selecting two or more clients from the plurality of clients sharing and using the searched image forming apparatus, selecting an image forming apparatus server according to a network connection type of the image forming apparatus, and installing the driver of the image forming apparatus on the two or more clients simultaneously through the selected image forming apparatus server.

The selecting the image forming apparatus server may include selecting the administrator terminal or one of the clients as the image forming apparatus server.

If the searched image forming apparatus is locally connected to the administrator terminal or one clients, the selecting the image forming apparatus server may include selecting the locally connected administrator terminal or the locally connected client as the image forming apparatus server.

BRIEF DESCRIPTION OF THE DRAWINGS

The above and/or other aspects of the present general inventive concept will become apparent and more readily appreciated from the following description of the exemplary embodiments, taken in conjunction with the accompanying drawings, in which.

DETAILED DESCRIPTION OF THE EMBODIMENTS

Figure 1:
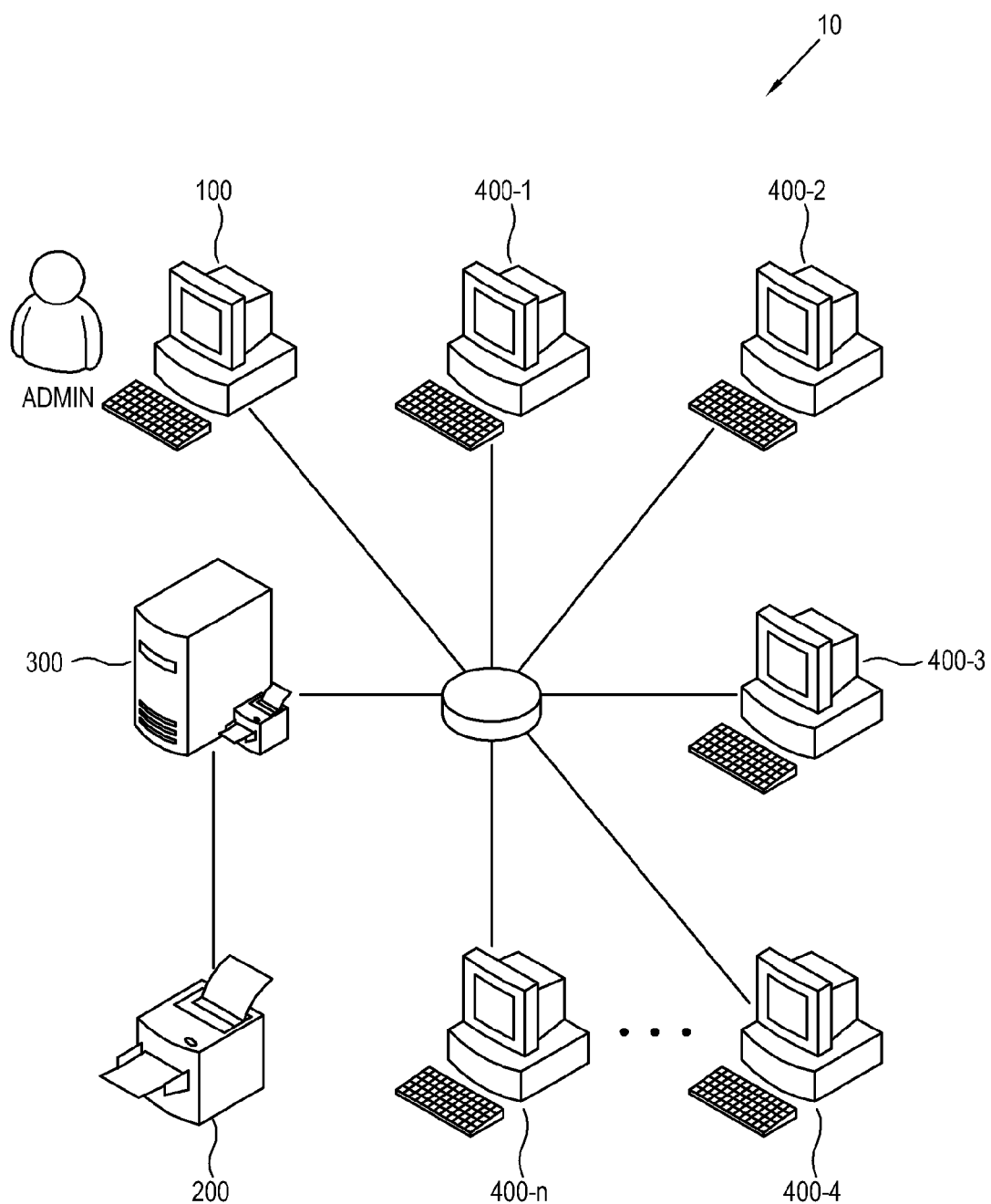
FIG. 1 schematically shows a configuration of an image forming system according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 schematically shows a configuration of an image forming system 10 according to an exemplary embodiment of the present general inventive concept.

As shown in FIG. 1, the image forming system 10 in this exemplary embodiment includes an administrator terminal 100, at least one image forming apparatus 200, an image forming apparatus server 300, and at least one client 400-1, 400-2, 400-3, 400-4, . . . , 400-n.

The administrator terminal 100, the image forming apparatus server 300, and at least one client 400-1, 400-2, 400-3, 400-4, . . . , 400-n may be a host apparatus such as a personal computer (i.e., PC) or the like, and the image forming apparatus 200 may be a printer, a multi-function peripheral having two or more functions, etc., which includes an image forming unit (not shown) to perform printing in response to a printing command and connected to a network, such as a local area network or by a universal serial bus (i.e., USB), a parallel port, a universal naming convention (i.e., UNC), a wired or wireless communication line, etc.

Here, the printing includes printing a copy after scanning a document, printing received fax data, and printing print data received from an external source through the host apparatus including a server or print data stored in the inside (such as a hard disk drive, i.e., HDD) the image forming apparatus 200 or outside (such as USB memory) the image forming apparatus 200. Since the printing and the image forming unit are well known, detailed descriptions thereof will be omitted.

If there are a plurality of clients, a user may use the image forming apparatus 200 by logging on to each of the clients 400-1, 400-2, 400-3, 400-4, . . . , 400-n.

Meanwhile, a user may log on through one client of the plural clients 400-1, 400-2, 400-3, 400-4, . . . , 400-n as an administrator in an administrator mode to allow a user to set up and change all settings of the image forming apparatus 200 without restriction.

Here, the client logged on in administrator mode may access other clients and install software such as a driver of the image forming apparatus 200 on the accessed client. Thus, the client logged on in administrator mode can be used as the administrator terminal 100.

The administrator terminal 100 in this embodiment selects at least one client on which a predetermined driver will be installed among the plurality of clients 400-1, 400-2, 400-3, 400-4, . . . , 400-n, and simultaneously installs the corresponding driver on at least one selected client.

According to an exemplary embodiment of the present general inventive concept, logging on in the administrator mode is possible in any of the plurality of clients 400-1, 400-2, 400-3, 400-4, . . . , 400-n, and the client where the logon in administrator mode occurs is employed as the administrator terminal 100. Also, in this embodiment, the same kind of driver may be simultaneously installed on the plurality of clients 400-1, 400-2, 400-3, 400-4, . . . , 400-n selected at once.

Meanwhile, the image forming apparatus 200 in this embodiment may be locally connected to the administrator terminal 100 or to only one client, or shared on a network as a network image forming apparatus to which an independent Internet protocol (IP) address is assigned.

If the image forming apparatus 200 is locally connected to the administrator terminal 100, the administrator terminal 100 includes the image forming apparatus server 300. Further, if the image forming apparatus 200 is locally connected to one client, the corresponding client includes the image forming apparatus server 300.

Further, if the image forming apparatus 200 is a network image forming apparatus, the administrator terminal 100 may set up one client out of clients 400-1, 400-2, 400-3, 400-4, . . . , 400-n as the image forming apparatus server 300. Here, as above, the client set up as the server may be the administrator terminal 100.

The administrator terminal 100 shares the driver of the image forming apparatus 200 installed in the image forming apparatus server 300, and copies an installing program that will install the shared driver on each client 400-1, 400-2, 400-3, 400-4, . . . , 400-n, thereby uniformly installing the driver on the corresponding client 400-1, 400-2, 400-3, 400-4, . . . , 400-n.

In this embodiment, the driver includes not only a printer driver to drive the image forming apparatus 200 specific to the type of image forming apparatus 200, but also various applications, software, solutions, etc. to further control the function of the image forming apparatus 200.

Figure 2:
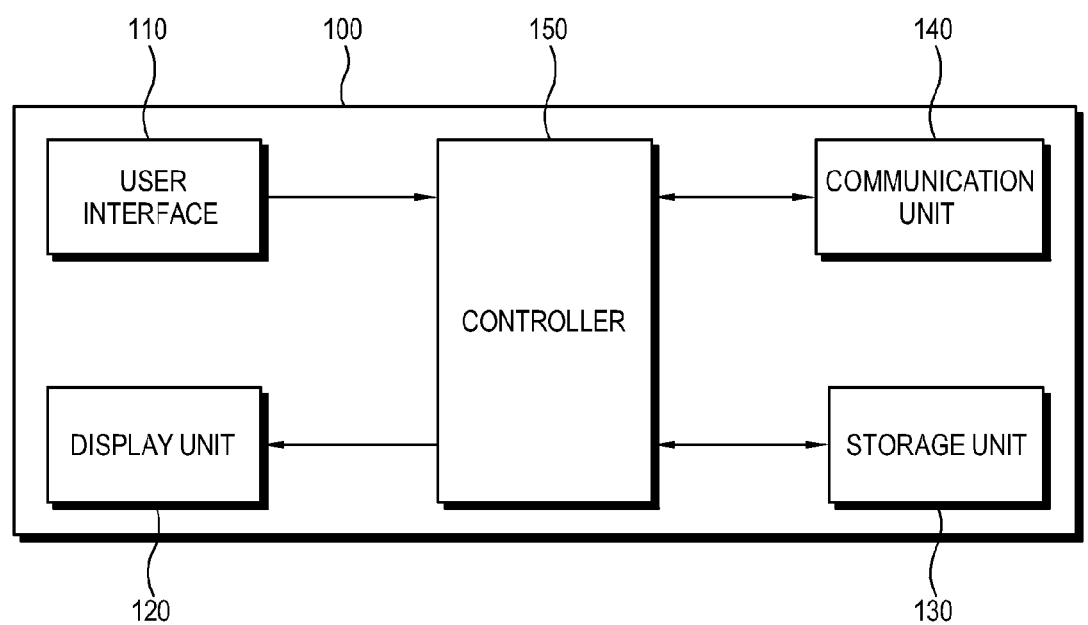
FIG. 2 is a block diagram showing a configuration of an administrator terminal according to an exemplary embodiment of the present general inventive concept.

FIG. 2 is a block diagram showing a configuration of the administrator terminal 100 according to an exemplary embodiment of the present general inventive concept.

As shown in FIG. 2, the administrator terminal 100 includes a user interface 110, a display unit 120, a storage unit 130, a communication unit 140, and a controller 150.

The user interface 110 allows a user to search for at least one image forming apparatus 200 usable in the image forming system 10 and to determine whether to share and use at least one found image forming apparatus 200 in the image forming system 10.

The controller 150 generates a signal to control the user interface 110 to generate data for an image as a user interface screen on the display unit 120. The display unit 120 may be installed in the administrator terminal 100 or disposed outside the administrator terminal 100 to be connected to the administrator terminal 100. The user interface 110 allows the user to select at least one client, on which the driver of the shared image forming apparatus 200 will be installed, among at least one client 400-1, 400-2, 400-3, 400-4, . . . , 400-n after determining whether to share the image forming apparatus 200.

Specifically, through the user interface 110, the user sets up a group including at least one client, on which the driver of the shared image forming apparatus 200 will be installed, among at least one client 400-1, 400-2, 400-3, 400-4, . . . , 400-n, and selects the driver of the shared image forming apparatus 200 to be installed on each client in the selected group. Here, the setup of the group may include creating a new group, adding a client included in a predetermined group, loading a previously set group, editing a group name or client, and/or deleting the group or the client.

Also, the user interface 110 allows the user to select the administrator terminal 100 or one among the clients 400-1, 400-2, 400-3, 400-4, . . . , 400-n as the image forming apparatus server 200, and input a sharing name of the shared image forming apparatus 200. The image forming apparatus server 300 may be selected based upon the type of shared image forming apparatus 200. Here, the sharing name may be given by the user or set up by the name of the image forming apparatus 200, the name of the group where the driver of the corresponding image forming apparatus 200 is installed, or a combination thereof, etc.

The user interface 110 allows the user to input a command to share the driver installing program stored in the image forming apparatus server 300, to copy the shared installing program to each client where the driver will be installed, and to install the driver of the image forming apparatus 200.

The user may input administrator identification (ID) and a password for the login as the administrator mode through the user interface 110. Then, the controller 150 may authenticate this user as a system administrator on the basis of the input administrator ID and password.

The user interface 110 may include a keyboard, a mouse, etc, provided as an input unit of the administrator terminal 100, and may include a graphic user interface (i.e., GUI, hereinafter also referred to as a "local user interface (i.e., LUI)) generated by executing a driver or a separate application and displayed on the display unit 120 allowing the user's input.

If the GUI is used as the user interface 110, the administrator terminal 100 displays the GUI. The GUI displays the found image forming apparatus 200 and at least one among the clients 400-1, 400-2, 400-3, 400-4, . . . , 400-n where the driver of the corresponding image forming apparatus 200 will be installed. One of these can be selected; and the user interface 110 receives commands to determine whether to share the image forming apparatus 200 and to set up a group including at least one client, on which the driver of the shared image forming apparatus 200 will be installed, through the displayed GUI.

The display unit 120 displays at least one found image forming apparatus 200 to be selected for sharing; at least one selectable client 400-1, 400-2, 400-3, 400-4, . . . , 400-n sharing the image forming apparatus 200; and an installation state of the driver according to each selected client 400-1, 400-2, 400-3, 400-4, . . . , 400-n.

Figure 3:
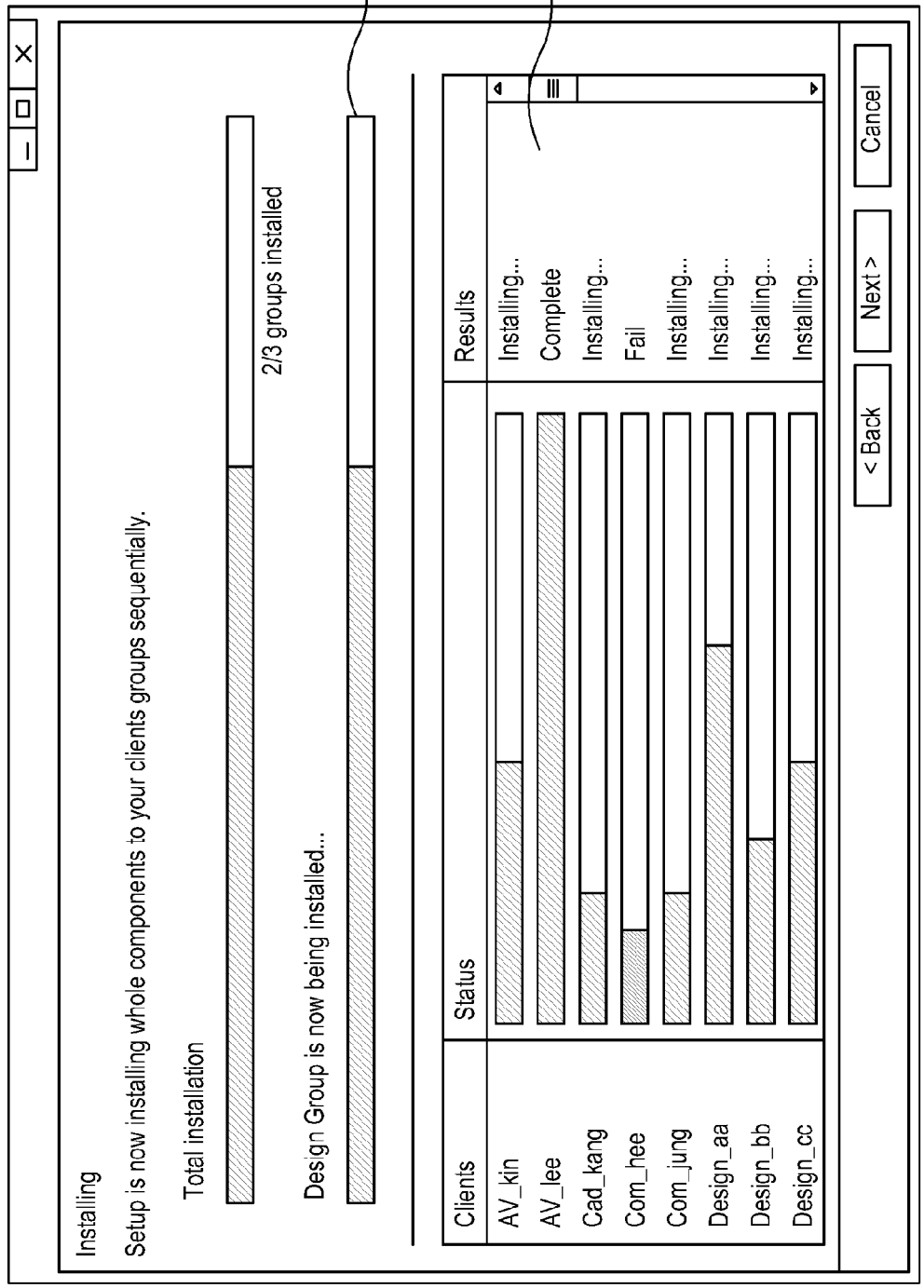
FIG. 3 illustrates a screen showing an installation state of a driver corresponding to clients according to an exemplary embodiment of the present general inventive concept.

Here, the display unit 120 may show the user a screen for setting up a group including at least one client 400-1, 400-2, 400-3, 400-4, . . . , 400-n provided in the image forming system 10, and the installation state of the driver with respect to at least one client included in the set group FIG. 3 illustrates a screen showing an installation state of a driver corresponding to clients according to an exemplary embodiment of the present general inventive concept.

As shown in FIG. 3, the screen includes a graph 31 showing an installed stage of the driver with respect to the whole clients, and a graph 32 showing an installed stage of the driver with respect to each client included in the group. Thus, a user can easily ascertain the installation state of the driver with respect to all of the clients and to each client through the display unit 120.

The display unit 120 may include a thin film transistor-liquid crystal display (TFT-LCD), and a driver (not shown) to drive the TFT-LCD.

In the foregoing exemplary embodiment, a user group including at least one client is set up and the driver is installed on the clients included in the set group, but not limited thereto. Alternatively, without setting up the group, at least one client where the driver will be installed may be selected and remote installation may be performed with respect to each client.

Information about the set group is stored in the storage unit 130. The storage unit 130 may be an internal or external storage module such as a HDD, a flash memory, etc. In this embodiment, the storage unit 130 of the administrator terminal 100 may additionally store authentication information to authenticate the administrator mode.

Meanwhile, the administrator terminal 100 in this exemplary embodiment may transmit the information about the set group to the image forming apparatus server 300 through the communication unit 140. The image forming apparatus server 300 can receive and store the information about the group from the administrator terminal 100.

The communication unit 140 communicates with the image forming apparatus 200, the image forming apparatus server 300, and at least one client 400-1, 400-2, 400-3, 400-4, . . . , 400-n.

Specifically, the administrator terminal 100 searches for an image forming apparatus 200 connected by the communication unit 140, transmits a command to install the driver while communicating the data with the image forming server 300 attached to the searched image forming apparatus 200 and each client on which the driver of the corresponding image forming apparatus 200 will be installed, and continuously communicates information about the installation state of the driver on each client.

Here, the communication unit 140 transmits a command for installing the driver on the clients included in a predetermined group, and continuously communicates the information about the installation state of the driver on each client.

To this end, the administrator terminal 100, the image forming apparatus server 300, and each client 400-1, 400-2, 400-3, 400-4, . . . , 400-n may have an installing manager installed as a monitoring program to remotely install the driver and transmit/receive data. Thus, the administrator terminal 100 communicates data with at least one client on the basis of a predetermined protocol, and installs the driver remotely through the installing manager.

The installing manager operates as an agent for efficiently controlling access between the administrator terminal 100 and each client and communicating of data such as various commands, state information, an installing program, etc. The installing manager installed in the administrator terminal 100 may be regarded as a remote installing manager.

The controller 150 performs general control of the administrator terminal 100. In more detail, the controller 150 searches for at least one connected image forming apparatus 200 in the image forming system 10, and controls the display unit 120 to show a user the searched results.

If the user selects at least one image forming apparatus 200 to be shared, the controller 150 controls the display unit 120 to display at least selectable one client 400-1, 400-2, 400-3, 400-4, . . . , 400-n connected to the shared image forming apparatus 200, thereby allowing the user to select at least one among the displayed clients 400-1, 400-2, 400-3, 400-4, . . . , 400-n to use the shared image forming apparatus 200.

Here, the controller 150 controls the display unit 120 to display a group setting screen for selecting at least one client sharing the image forming apparatus 200, and, if at least one client included in the set group is selected on the displayed group setting screen through the user interface 110, controller 150 remotely installs the driver on at least one selected client included in the corresponding group.

For the installation, the administrator terminal 100 communicates a command or state information with each client included in the group and includes the installing manager, i.e., a monitoring module for remotely installing the driver. The monitoring module may be added as a separate element or included in the controller 150.

Further, the controller 150 may set up the sharing name of the shared image forming apparatus 200. Here, the sharing name may be input by the user through the user interface 110, or may be set up as the name of the group where the driver of the corresponding image forming apparatus 200 is installed, or a combination thereof, etc.

Meanwhile, the controller 150 may select the administer terminal 100 or one of the clients 400-1, 400-2, 400-3, 400-4, . . . , 400-n as the image forming apparatus server 300 according to the type of network connection of the shared image forming apparatus 200.

Specifically, a user may select the administrator terminal 100 as the image forming apparatus server 300 if the image forming apparatus 200 is locally connected to the administrator terminal 100. That is, the administrator terminal 100 may include the image forming apparatus server 300. The controller 150 shares a folder, where the installing program for the image forming apparatus server 300 is stored, which may be located in the storage unit 130 of the administrator terminal 100, and copies the installing program of the shared folder to each client. Further, the copied installing program is executed to thereby remotely install the driver. Here, the driver is remotely and simultaneously installed on the clients Alternatively, if the image forming apparatus 200 is locally connected not to the administrator terminal 100 but to another client, the controller 150 selects the locally connected client as the image forming apparatus server 300. That is, the client may include the image forming apparatus server 300. Further, the controller 150 shares a folder, where the installing program is stored, with the client selected as the image forming apparatus server 300, copies the installing program from the shared folder to each client, and executes the copied installing program to thereby remotely install the driver.

Alternatively, if the image forming apparatus 200 is an image forming apparatus with an independent Internet protocol (IP) address assigned to it, the controller 150 may select either of the administrator terminal 100 or one of the connected clients 400-1, 400-2, 400-3, 400-4, . . . , 400-n as the image forming apparatus server 300 according to a user's input through the user interface 110. Then, the controller 150 shares the folder where the installing program for the driver is stored, copies the installing program from the shared folder to each client, and executes the copied installing program to thereby remotely install the driver.

Here, the controller 150 may analyze the driver installed in the image forming apparatus server 300 and determine a version of the driver, and upgrade the corresponding driver depending on the results of the determination. Also, the controller 150 may determine whether the corresponding driver is previously installed or not with respect to each client on which the driver will be installed, and upgrade the corresponding driver on the basis of the determination results.

Meanwhile, the controller 150 receives information about the installation state from each client included in the group, and controls the display unit 120 to display the information about the installation state for each of the clients as shown in FIG. 3. Here, the controller 150 may control the display unit 120 to display a result screen reporting whether the installation of the driver is succeeded or failed when the installation of the driver is ended.

The user may select whether to reinstall the driver on the client where the installation of the driver failed, through the user interface 110 on the basis of the result screen displayed on the display unit 120. Further, the user may select an installation result report to be printed.

If the user selects the client, on which the installation of the driver failed, to be reinstalled, the controller 150 remotely installs the driver again on the corresponding client. Meanwhile, either or both of the installing program and the installing manager compiled to the client may be deleted after completing the installation.

The above-described copying and installing operations for the installing program may be performed as a background (i.e., silent) mode in the client, and therefore a user may not recognize the foregoing operations while utilizing the client.

In the image forming system 10 shown in FIG. 1, each client receives various commands for remotely installing the driver from the administrator terminal 100, and installs the driver received from the administrator terminal 100. To this end, an installing manager is installed as a monitoring program (i.e., an agent program) in each client, and the installing manager periodically transmits the state (setting information) of the client, information about the installation state, etc. to the administrator terminal 100.

Figure 4:
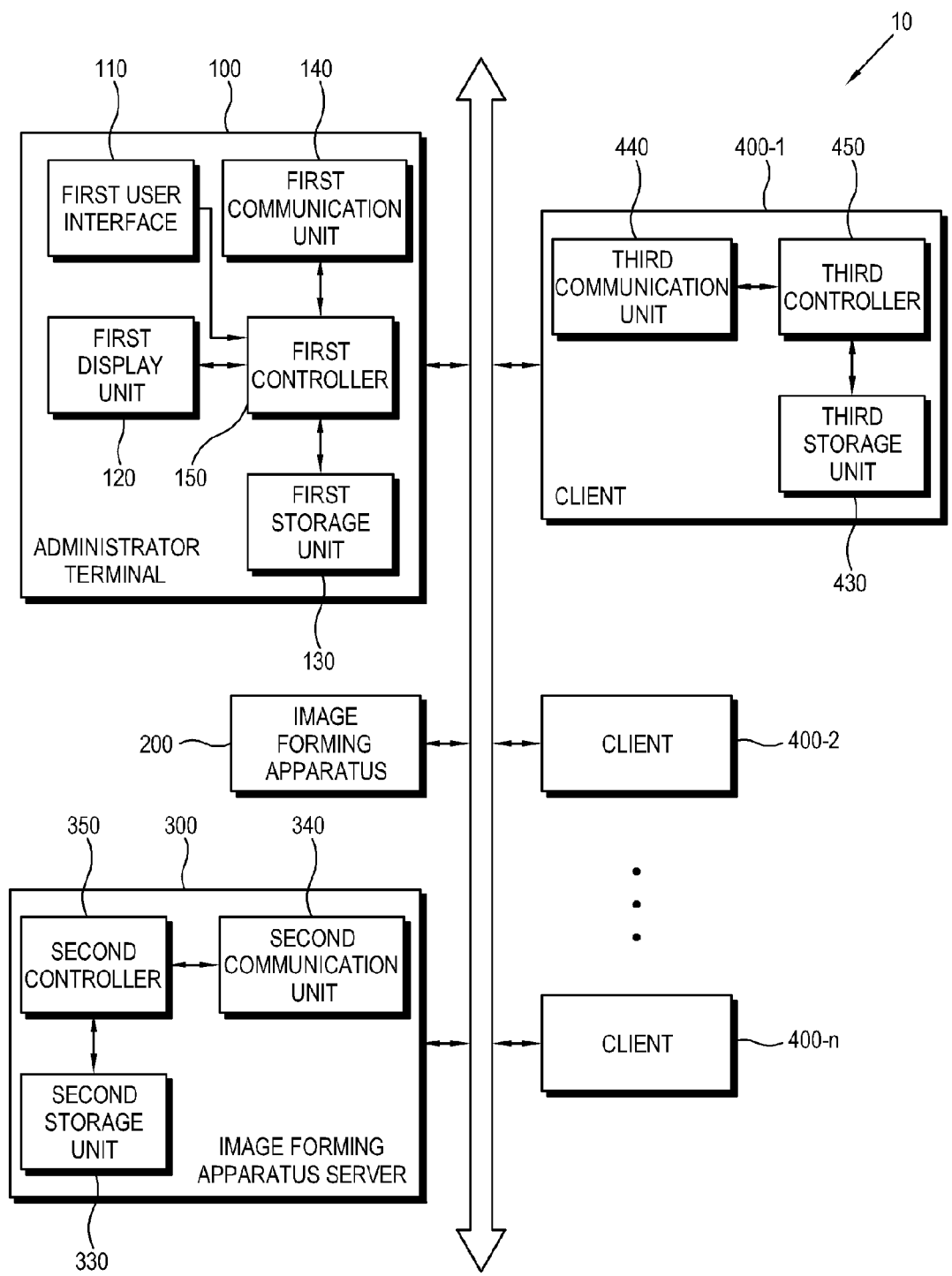
FIG. 4 is a block diagram showing the configuration of the image forming system according to an exemplary embodiment of the present general inventive concept.

FIG. 4 is a block diagram showing the configuration of the image forming system 10 according to an exemplary embodiment of the present general inventive concept.

As shown in FIG. 4, the image forming system 10 in this exemplary embodiment includes an administrator terminal 100, at least one image forming apparatus 200, an image forming apparatus server 300, and at least one of clients 400-1, 400-2, 400-3, 400-4, . . . , 400-n. Here, the administrator terminal 100 or at least one client 400-1, 400-2, 400-3, 400-4, . . . , 400-n may be employed as the image forming apparatus server 300 as necessary. The employment of the administrator terminal 100 or at least one client 400-1, 400-2, 400-3, 400-4, . . . , 400-n as the image forming apparatus server 300 was described hereinabove.

Throughout the exemplary embodiments of the present general inventive concept shown in FIGS. 1 and 4, like elements having the same function refer to like numerals, and descriptions about the corresponding elements may be common to the exemplary embodiments shown in FIGS. 1 and 4.

The administrator terminal 100 searches for at least one connected image forming apparatus 200 within the image forming system 10 through a first communication unit 140, and determines whether to share the searched image forming apparatus 200 from a user's input through a first user interface 110.

The user selects at least one client 400-1, 400-2, 400-3, 400-4, . . . , 400-n sharing the image forming apparatus 200 through the first user interface 110, and sets up the sharing name of the shared image forming apparatus 200.

A first controller 150 selects the administrator terminal 100 or one among the clients 400-1, 400-2, 400-3, 400-4, . . . , 400-n as the image forming apparatus server 300 for the shared image forming apparatus 200 based upon the type of image forming apparatus, and installs the corresponding driver by sharing the folder where the installing program for the driver of the selected image forming apparatus is stored on the image forming apparatus server 300.

The image forming apparatus server 300 shares a folder of a second storage unit 330, in which the installing program and the installing manager is stored, in response to a command received from the administrator terminal 100 through a second communication unit 340, and transmits the installing program and the installing manager stored in the second storage unit 330 to each client where the driver will be installed, through the second communication unit 340 under control of a second controller 350.

The client 400-1 selected to install the driver thereon by the administrator terminal 100 receives the installing program and the installing manager from the image forming apparatus server 300 through a third communication unit 440 and stores them in a third storage unit 430. A third controller 450 executes the received installing manager and installing program to install the corresponding driver on the client 400-1, and uses the installing manager to thereby transmit the information about the installation state to the administrator terminal 100 through the third communication unit 440.

The administrator terminal 100 receives the information about the installation state from each client 400-1, 400-2, 400-3, 400-4, . . . , 400-n, and shows the installation state information to the user through a first display unit 120.

Thus, it is possible to simultaneously install the driver on a plurality of clients by a single remote installation from the administrator terminal 100.

Figure 5:
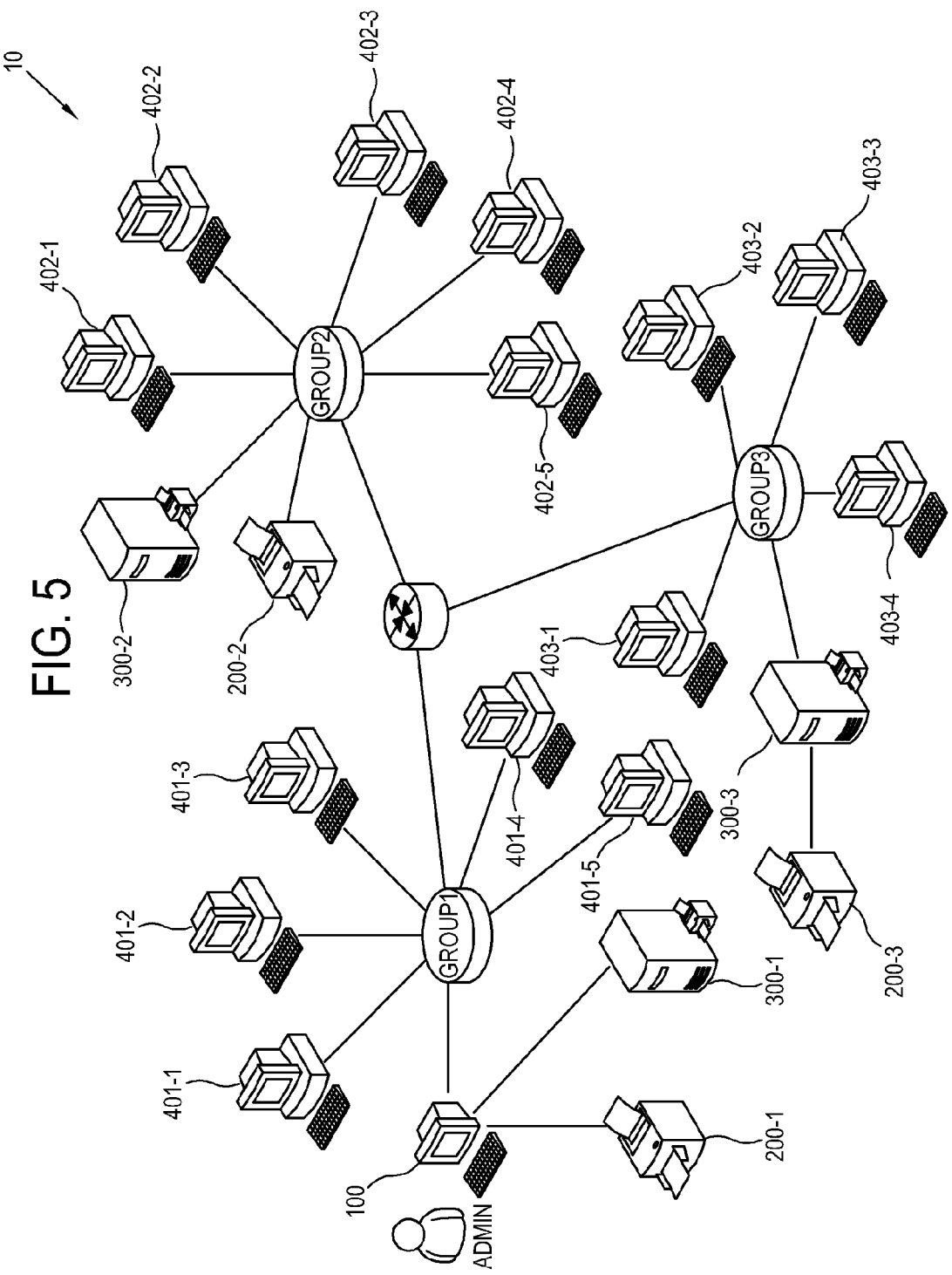
FIG. 5 schematically shows a configuration of an image forming system according to another exemplary embodiment of the present general inventive concept.

FIG. 5 schematically shows a configuration of an image forming system according to another exemplary embodiment of the present general inventive concept.

In this exemplary embodiment shown in FIG. 5, the driver is remotely installed by the administrator terminal 100 on the image forming system 10 in which three image forming apparatuses 200-1, 200-2 and 200-3, each having a different network connection type, are shared among fifteen clients grouped into three GROUP 1, GROUP 2 and GROUP 3. While fifteen clients and three groups are shown, it should be understood that the system may include more or less than fifteen clients and more or less than three groups. Here, the clients included in a first group GROUP 1 share the first image forming apparatus 200-1, the clients included in a second group GROUP 2 share the second image forming apparatus 200-2, and the clients included in a third group GROUP 3 share the third image forming apparatus 200-3.

In more detail, the first image forming apparatus 200-1 is locally connected to the administrator terminal 100. Thus, the administrator terminal 100 is selected as a first image forming apparatus server 300-1, shares the installing program stored in the storage unit 130, and uniformly transmits and executes the shared installing program to the clients 401-1, 401-2, 401-3, 401-4 and 401-5 included in the first group GROUP 1, thereby installing the driver simultaneously on each of the clients 401-1, 401-2, 401-3, 401-4 and 401-5 included in the first group GROUP 1.

Also, the second image forming apparatus 200-2 is a network image forming apparatus with an assigned independent Internet protocol (IP) address. Thus, the administrator terminal 100 selects one of the clients included in the second group GROUP 2 as the second image forming apparatus server 300-2. The administrator terminal 100 shares the installing program stored in the second image forming apparatus server 300-2, and uniformly transmits and executes the shared installing program to the clients 402-1, 402-2, 402-3, 402-4 and 402-5 included in the second group GROUP 2, thereby installing the driver simultaneously on each of the clients 402-1, 402-2, 402-3, 402-4 and 402-5 included in the second group GROUP 2.

The third image forming apparatus 200-3 is locally connected to one of the clients included in the third group GROUP 3. Thus, the administrator terminal 100 selects the corresponding client as the third image forming apparatus server 300-3. The administrator terminal 100 shares the installing program stored in the third image forming apparatus server 300-3, and uniformly transmits and executes the shared installing program to the other clients 403-1, 403-2, 403-3 and 403-4 included in the third group GROUP 3, thereby installing the driver simultaneously on each of the clients 403-1, 403-2, 403-3 and 403-4 included in the third group GROUP 3.

In the foregoing exemplary embodiment shown in FIG. 5, one client may be included in one group, but is not limited thereto. Alternatively, one client may belong to two or more group, and one client may be set up to share and use the drivers of two or more image forming apparatuses regardless of the group setting of the client.

In the image forming apparatus 10 with the above described configurations, a process of remotely installing the driver will be described with reference to FIGS. 6A and 6B.

Figure 6A:
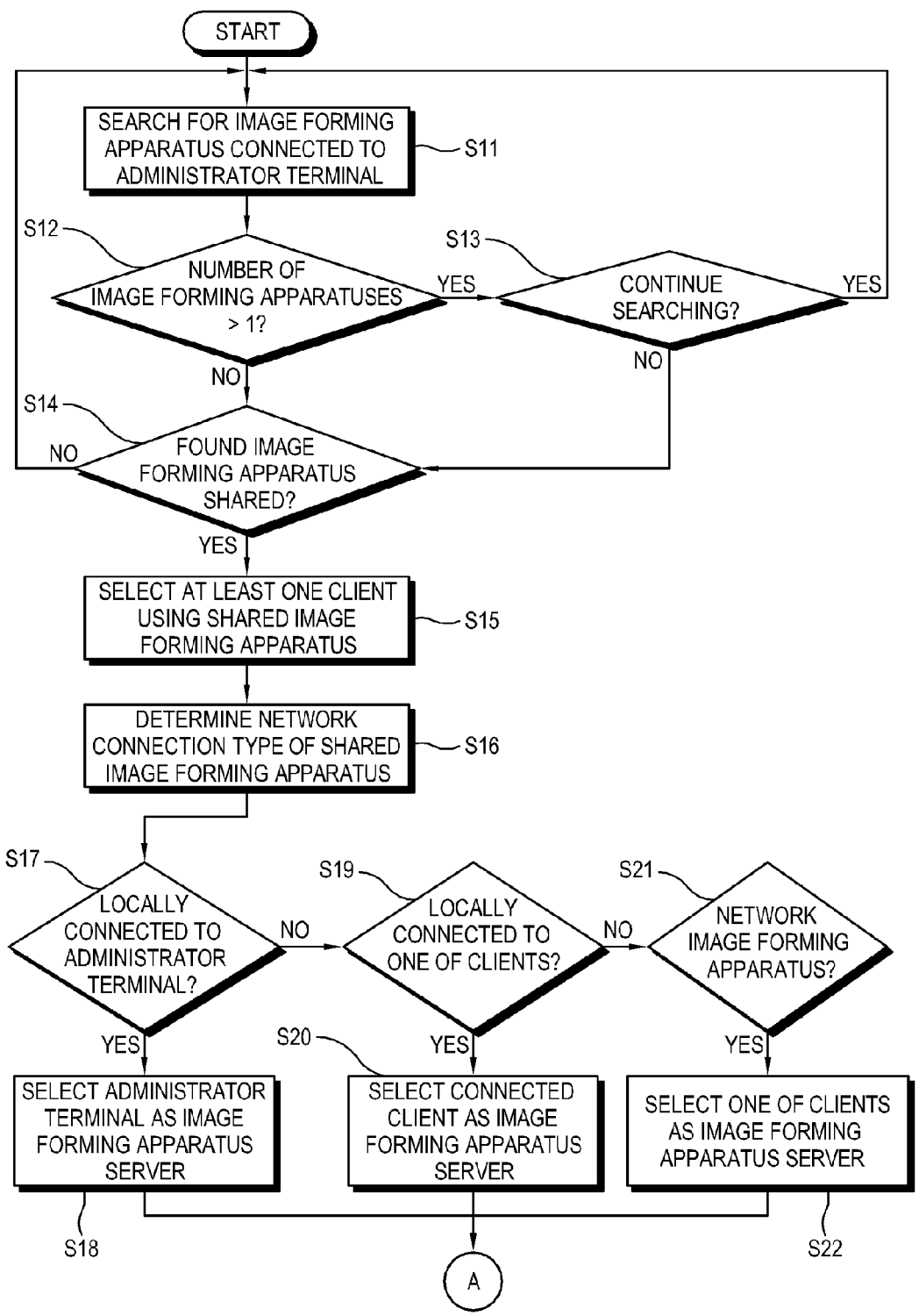
FIGS. 6A and 6B are flowcharts of a remote installing method for a driver according to an exemplary embodiment of the present general inventive concept.

Referring to FIG. 6A, at operation S11, the administrator terminal 100 may search for at least one image forming apparatus 200 connected to the image forming system 10.

Of the image forming apparatuses found in the operation S11, the number of image forming apparatuses is determined in operation S12. If one or more image forming apparatuses are found, a user may select whether to continue searching at operation S13.

At operation S14, a user may select whether to share and use the image forming apparatus 200 found in the operation S11. Here, the administrator terminal 100 may select the sharing name of the image forming apparatus 200. Here, the sharing name may be input by a user through the user interface 110 or set up by the name of the image forming apparatus 200, the name of the group where the driver of the corresponding image forming apparatus 200 set up in the following operation S15 is installed, or a combination thereof, etc.

If the image forming apparatus 200 is selected to be shared in the operation S14, the user may select at least one client 400-1, 400-2, 400-3, 400-4, . . . , 400-n sharing the image forming apparatus 200 at operation S15. Here, the user may set up a group including at least one client 400-1, 400-2, 400-3, 400-4, . . . , 400-n, and then the user selects whether to use the shared image forming apparatus 200 in the set group. Information about the set group may be stored in the storage unit 130. The user may use the previously stored information about the group while setting up the group, where the previously stored information contains information about the clients included in a predetermined group, and information about the driver installation for the clients.

At operation S16, the administrator terminal 100 determines the network connection type of the image forming apparatus 200 shared in the operation S14.

If it is determined at operation S17 that the image forming apparatus 200 is locally connected to the administrator terminal 100, the administrator terminal 100 is selected as the image forming apparatus server 300 at operation S18.

Alternatively, if it is determined at operation S19 that the image forming apparatus 200 is locally connected to one of the clients, the administrator terminal 100 selects the client locally connecting with the image forming apparatus 200 as the image forming apparatus server 300 at operation S20.

Alternatively, if it is determined at operation S21 that the image forming apparatus 200 is a network image forming apparatus with an assigned independent IP address, the administrator terminal 100 selects one of the clients as the image forming apparatus server 300 at operation S22. Here, the administrator terminal 100 may be selected as the image forming apparatus server 300.

Figure 6B:
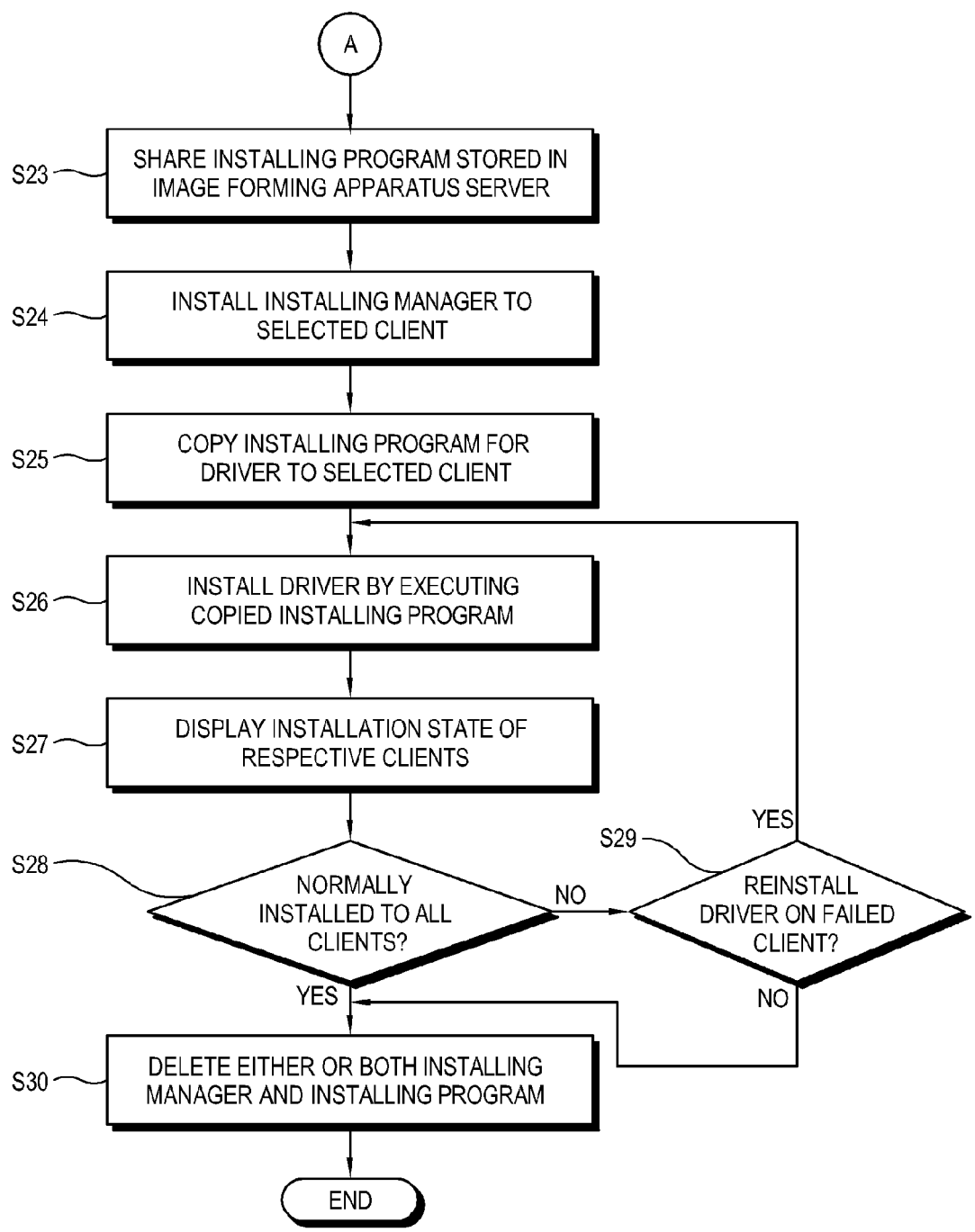

The process of remotely installing the driver is continued with reference to FIG. 6B. After the image forming apparatus server 300 is selected in the operation S18, S20 or S22, the administrator terminal 100 shares the installing program and the installing manager stored in the image forming apparatus server 300 at operation S23. Here, if the driver is not installed in the image forming apparatus server 300, the administrator terminal 100 installs the driver on the image forming apparatus server 300 and shares the installed driver. Further, the version of the driver previously installed in the image forming apparatus server 300 may be ascertained and then updated.

At operation S24, the administrator terminal 100 installs the monitoring program, i.e., the installing manager, on the client selected in the operation S15. The installing in the operation S24 may include executing a previously installed program or updating and executing it.

At operation S25, the administrator terminal 100 copies the installing program shared in the operation S23 to the client selected in the operation S15.

At operation S26, the administrator terminal 100 installs the driver by executing the installing program copied in the operation S25.

At operation S27, the administrator terminal 100 shows the user the installation states through the display unit 120 of the respective clients in which the installing program is executed in the operation S26. Here, the display of the operation S27 may include reporting whether the installation of the driver was successful or failed in each of the respective clients.

At operation S28, the administrator terminal 100 determines whether the driver is normally installed on each client.

If the driver is normally installed on all the selected clients in the operation S15, the administrator terminal 100 deletes either or both the installing program and the installing manager copied to each client and stops all the remote installation operations at operation S29.

On the other hand, if the driver is abnormally or unsuccessfully installed on some clients, a user may select whether to reinstall the driver on each client where the installation of the driver failed, through the user interface 110 at operation S30.

If the user selects the reinstallation, the administrator terminal 100 installs the driver again on the corresponding clients.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

According to an exemplary embodiment of the present general inventive concept, the administrator terminal 100 not only remotely and simultaneously installs the driver on at least one client, but also shows the installation state to a user and selectively reinstalls the drivers on only the client where the driver installation failed, thereby allowing the user to conveniently install the driver as well as saving time and cost in the installation.

Further, the administrator terminal 100 or one of the clients is selected as the image forming apparatus server 300 depending on the type and network connection of image forming apparatus 200, and the installing program of the selected image forming apparatus server 300 is shared to thereby allow the user to more easily install the driver remotely to the plurality of clients simultaneously.

Although various exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. A non-transitory computer readable medium storing a program, including instructions, which is executed by a computer, causes the computer to perform a method comprising:

searching for at least one image forming apparatus by an administrator terminal;

determining a network connection type of the searched image forming apparatus;

selecting via a user interface one of the administrator terminal and at least one client connected to the image forming apparatus to be an image forming apparatus sever providing a driver installing program for the searched image forming apparatus in response to the determined network connection type;

installing a driver for the searched image forming apparatus on at least one client using the selected image forming apparatus server.

2. The non-transitory computer readable medium according to claim 1, the method further comprising selecting via the user interface the administrator terminal to be the image forming apparatus sever when it is determined that the searched at least one image forming apparatus is locally connected to the administrator terminal.

3. The non-transitory computer readable medium according to claim 1, the method further comprising selecting via the user interface a client to be an image forming apparatus sever when it is determined that the searched at least one image forming apparatus is locally connected to the client.

4. The non-transitory computer readable medium according to claim 1, wherein the installing the driver for the searched image forming apparatus comprises:

sharing a driver installed in the determined image forming apparatus server; and installing the driver for the searched image forming apparatus on the client using the shared driver installed in the image forming apparatus server.

5. The non-transitory computer readable medium according to claim 1, wherein the installing the driver for the searched image forming apparatus comprises:

transmitting a copy of the installing program from the image forming apparatus server to the client and executing the copied installing program.

6. The non-transitory computer readable medium according to claim 1, wherein the method further comprises selecting a sharing name of the shared image forming apparatus.

7. The non-transitory computer readable medium according to claim 1, wherein the method further comprise setting up a group including a plurality of clients, and the installing of the driver comprises installing the driver to the plurality of clients included in the set group.

8. The non-transitory computer readable medium according to claim 1, wherein the method further comprises installing an agent program, by the administrator terminal, for installing the driver on the client, wherein the installing of the driver comprises using the agent program.

9. A method to remotely install a driver for at least one image forming apparatus on at least one client by an administrator terminal, the method comprising:

searching for at least one image forming apparatus by an administrator terminal;

determining a network connection type of the searched image forming apparatus;

selecting via a user interface one of the administrator terminal and at least one client connected to the image forming apparatus to be an image forming apparatus sever providing a driver installing program for the searched image forming apparatus in response to the determined network connection type;

installing a driver for the searched image forming apparatus on at least one client using the selected image forming apparatus server.

10. The method according to claim 9, further comprising selecting via the user interface the administrator terminal to be the image forming apparatus sever when it is determined that the searched at least one image forming apparatus is locally connected to the administrator terminal.

11. The method according to claim 9, further comprising selecting via the user interface a client to be the image forming apparatus sever when it is determined that the searched at least one image forming apparatus is locally connected to the client.

12. The method according to claim 9, wherein the installing the driver for the searched image forming apparatus comprises:
sharing a driver installed in the determined image forming apparatus server; and
installing the driver for the searched image forming apparatus on the client using the shared driver installed in the image forming apparatus server.

13. The system according to claim 12, wherein if the driver is previously installed in the client, the first controller controls the first communication unit to transmit a command for updating the previously installed driver, and
wherein the second controller updates the previously installed driver with the driver.

14. The method according to claim 9, wherein the installing the driver for the searched image forming apparatus comprises:
transmitting a copy of the installing program from the image forming apparatus server to the client and executing the copied installing program.

15. The method according to claim 9, further comprise setting up a group including a plurality of clients, and
wherein the installing of the driver comprises installing the driver to the plurality of clients included in the set group.

16. A system comprising an administrator terminal, at least one image forming apparatus and at least one client, the administrator terminal comprising:
a first communication unit which communicates with the at least one image forming apparatus and the at least one client, searches for the at least one image forming apparatus, and determines a network connection type of the searched image forming apparatus;
a user interface to allow a user to select one of the administrator terminal and at least one client connected to the image forming apparatus to be a image forming apparatus server providing a driver installing program for the searched image forming apparatus in response to the determined network connection type; and
a first controller which controls the communication unit to transmit a command to search for the at least one image forming apparatus and to install a driver for the searched image forming apparatus on at least one client using the selected image forming apparatus server, the at least one client comprising:
a second communication unit which communicates with the selected image forming apparatus server; and
a second controller which installs the driver on the client using the selected image forming apparatus server when receiving a command for installing the driver from the first controller through the second communication unit.

17. The system according to claim 16, wherein the user interface allows the user to select a administrator terminal to be the image forming apparatus server when it is determined that the searched at least one image forming apparatus is locally connected to the administrator terminal and to select a client to be the image forming apparatus sever when it is determined that the searched at least one image forming apparatus is locally connected to the client.

18. The system according to claim 16, wherein the first controller controls the first communication unit to transmit a command for sharing a driver installed in the selected image forming apparatus server; and installing the driver for the searched image forming apparatus on the client using the shared driver installed in the image forming apparatus server.

19. The system according to claim 16, wherein the user interface allows the user to set up a group including a plurality of clients, and the first controller controls the first communication unit to transmit a command for installing the driver to the plurality of clients included in the set group.

20. The system according to claim 16, wherein the first controller controls the first communication unit to transmit a command for installing an agent program for installing the driver to the client, and
wherein the second controller installs the agent program on the client and installs the driver on the client using the agent program.

* * * * *

UNITED STATES PATENT AND TRADEMARK OFFICE
CERTIFICATE OF CORRECTION

PATENT NO. : 8,860,980 B2  
APPLICATION NO. : 12/609367  
DATED : October 14, 2014  
INVENTOR(S) : Jung-soo Seo It is certified that error appears in the above-identified patent and that said Letters Patent is hereby corrected as shown below:

Title page, (57) (Abstract), Line 3:

After "remotely" delete "an".

Title page, (57) (Abstract), Line 4:

After "remotely" delete "an".

Claims

Claim 1, Column 14, Line 8:

Delete "sever" and insert --server--, therefor.

Claim 1, Column 14, Line 10:

After "type;" insert --and--.

Claim 2, Column 14, Line 17:

Delete "sever" and insert --server--, therefor.

Claim 3, Column 14, Line 22:

Delete "sever" and insert --server--, therefor.

Claim 9, Column 14, Line 62:

Delete "sever" and insert --server--, therefor.

Claim 6, Column 14, Line 64:

After "type" insert --an--.

Claim 10, Column 15, Line 64:

Delete "sever" and insert --server--, therefor.

Claim 11, Column 15, Line 8:

Delete "sever" and insert --server--, therefor.

Claim 17, Column 16, Line 22:

Delete "sever" and insert --server--, therefor.

Signed and Sealed this  
Thirteenth Day of October, 2015

Michelle K. Lee  
*Director of the United States Patent and Trademark Office*